Patented Mar. 13, 1923.

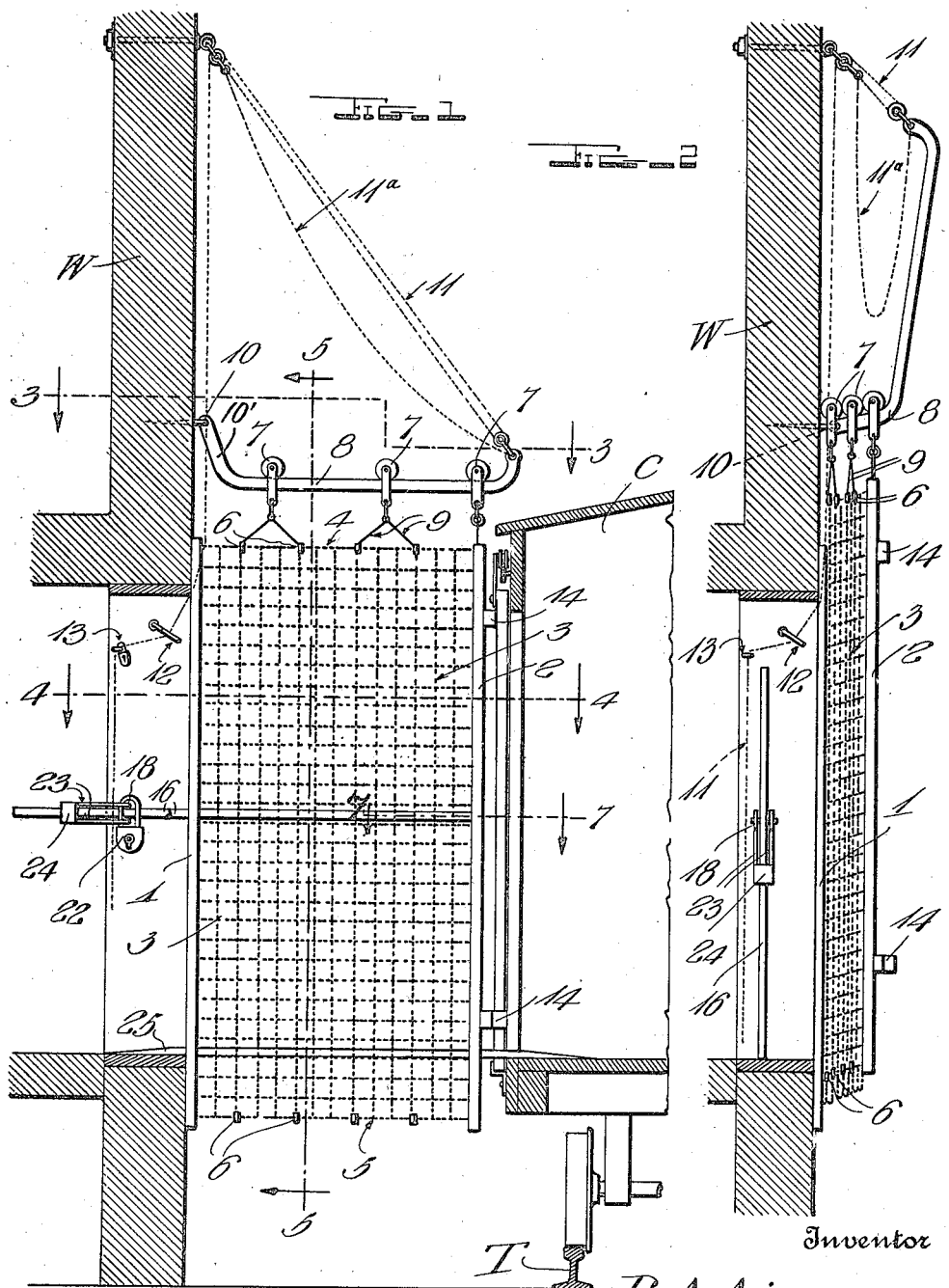

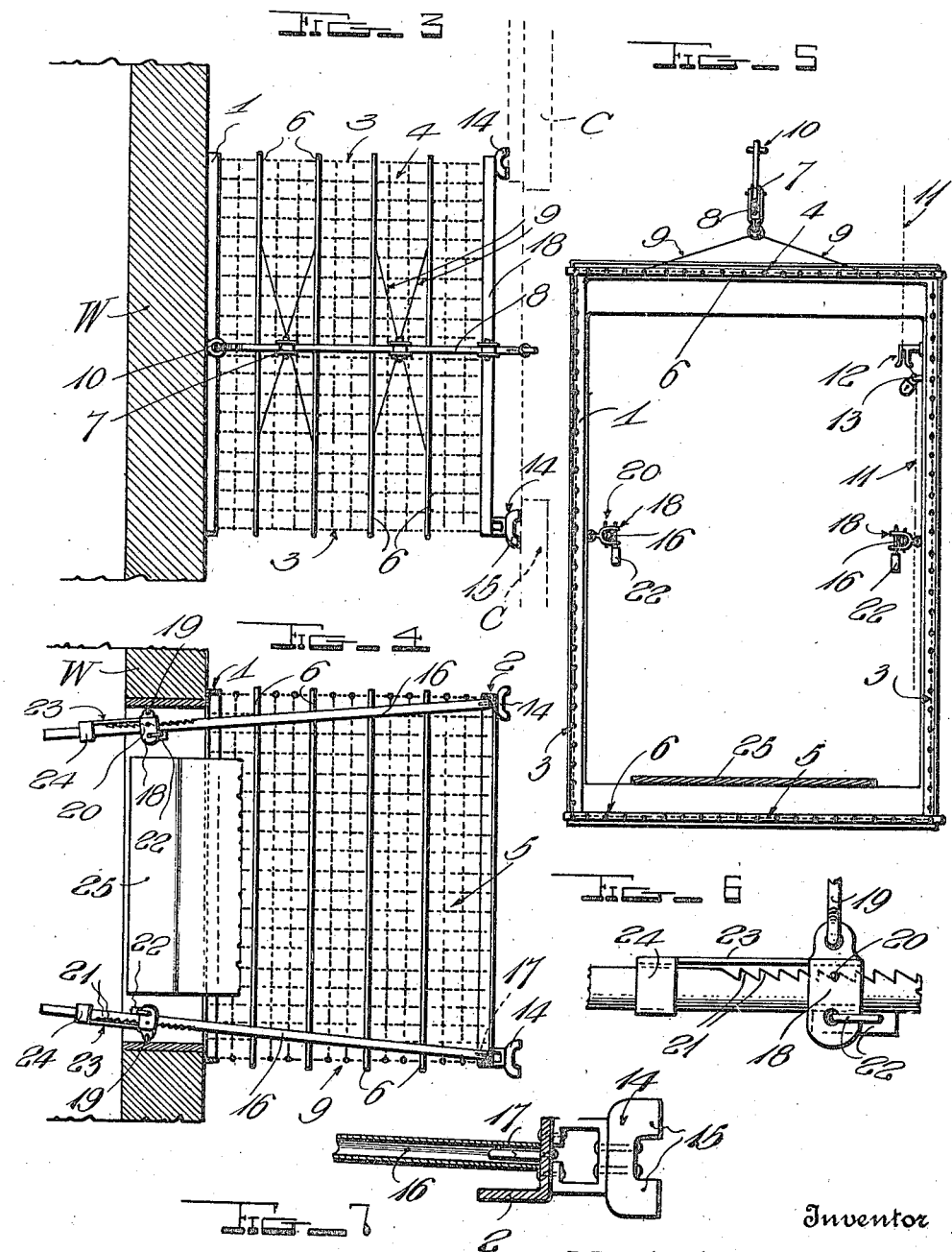

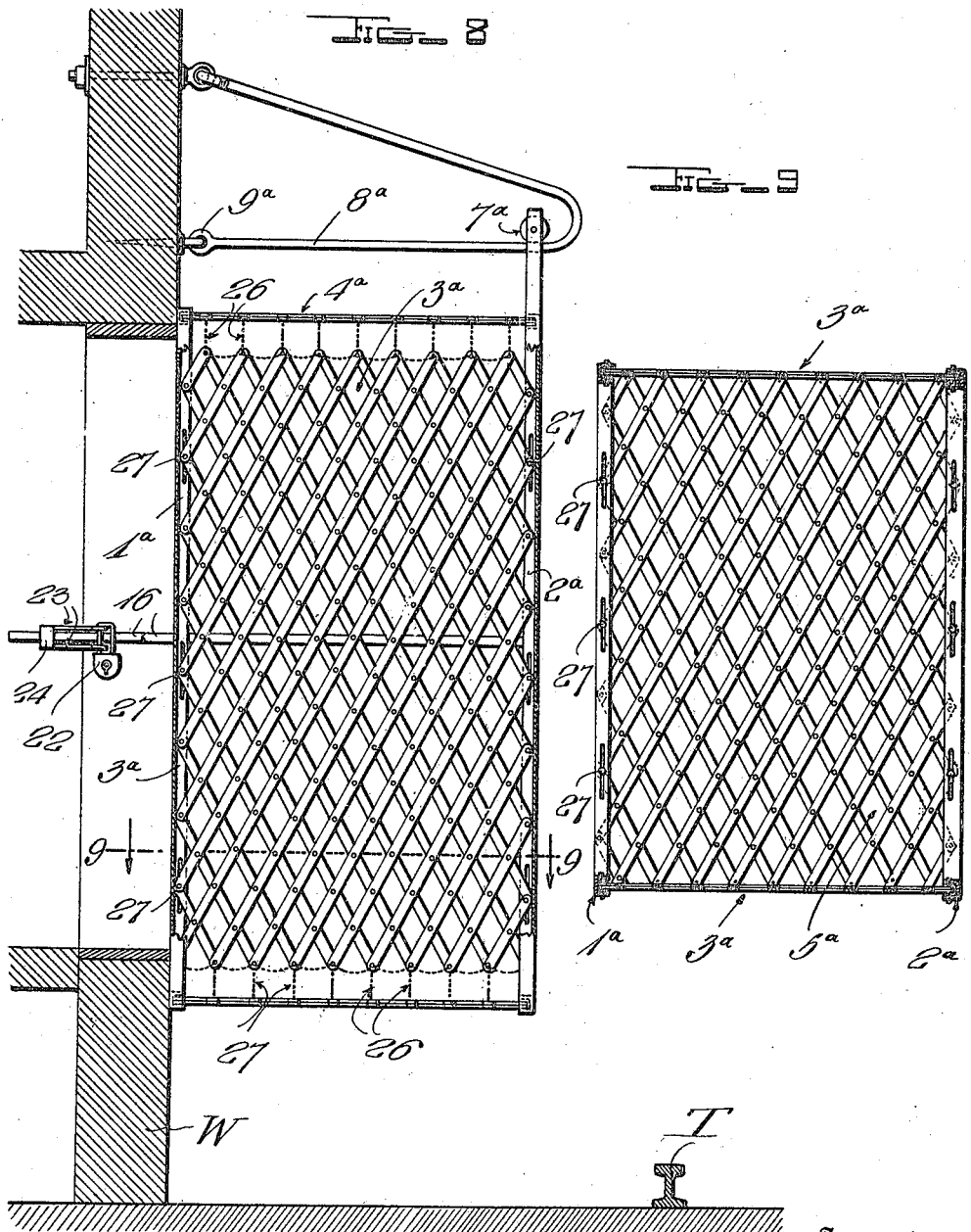

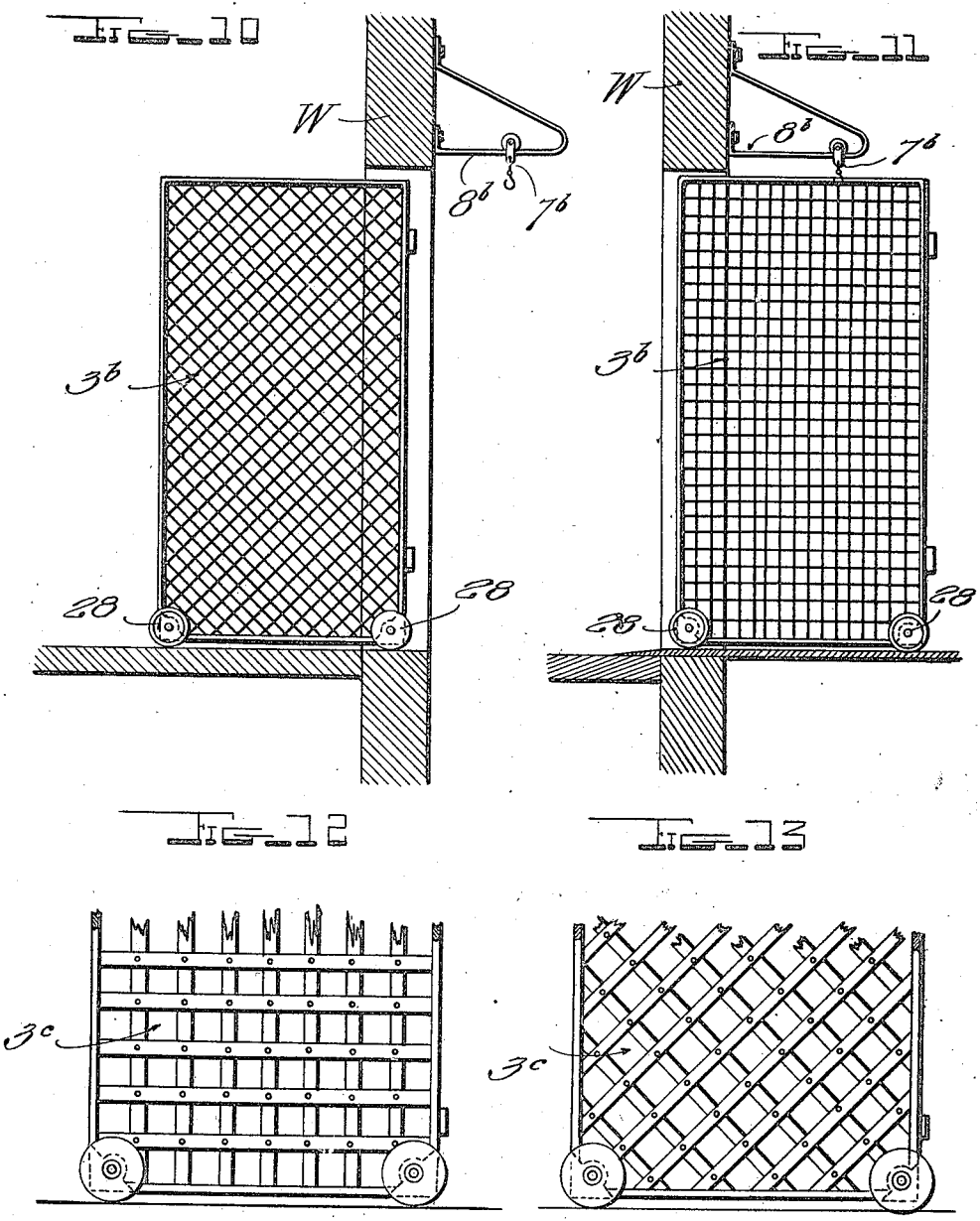

1,448,611

UNITED STATES PATENT OFFICE.

RICHARD A. AINSA, OF EL PASO, TEXAS.

ANTITHIEF CAGE.

Application filed August 24, 1922. Serial No. 584,151.

*To all whom it may concern:*

Be it known that I, RICHARD A. AINSA, a citizen of the United States, residing at El Paso, in the county of El Paso and State of Texas, have invented certain new and useful Improvements in Antithief Cages; and I do declare the following to be a full, clear, and exact description of the invention, such as will enable others skilled in the art to which it appertains to make and use the same.

My invention has for its object to provide a novel device for preventing theft of any freight while being transferred from a freight car to a warehouse or other car, or vice versa and in carrying out this end, I employ a cage open at two sides for communication with the doorways of the car and warehouse or the two cars, while said cage is closed on other sides to prevent anyone from entering it from the exterior and to prevent any of the workmen from passing any goods to the exterior. Thus, it is not necessary for the warehouse foreman or other authorized persons, to constantly watch the loading or unloading operations, as is now usually necessary.

With the foregoing in view, other objects are to construct and mount the cage in such a manner that it may readily be retracted when not in use, may be locked in projected position when in use, and may yield laterally to prevent injury in case the freight car should be moved before the cage is disengaged therefrom.

With the foregoing in view, the invention resides in the novel subject matter hereinafter described and claimed, the description being supplemented by the accompanying drawings.

Figure 1 is a side elevation of the preferred form of the invention, showing it extended for use between a warehouse door and a car door.

Figure 2 is a duplicate of Fig. 1 with the exception that it illustrates the cage collapsed against the side of the warehouse.

Figure 3 is a horizontal section on line 3—3 of Fig. 1, showing a top plan view of the cage.

Figure 4 is a horizontal sectional view through the cage as indicated by line 4—4 of Fig. 1.

Figure 5 is a vertical transverse section on line 5—5 of Fig. 1.

Figure 6 is an enlarged plan view showing more particularly the means for locking the cage in projected position.

Figure 7 is a detail horizontal section on line 7—7 of Fig. 1.

Figure 8 is a view similar to Fig. 1 but showing a different form of construction.

Figure 9 is a horizontal section on line 9—9 of Fig. 8.

Figures 10 and 11 are views similar to Fig. 1, showing two rigid forms of cages in retracted and projected positions respectively.

Figures 12 and 13 are detail side elevations of cages constructed of wooden slats instead of employing metal structures as intended in the preceding figures.

In the drawings above briefly described, reference being had more particularly to Figs. 1 to 7, the numeral 1 designates a rectangular frame adapted to be secured to the side of a warehouse W around a door frame which is located adjacent a railway track T, such as one of the usual spurs or switches running from main lines to factories, warehouses and the like. The numeral 2 designates an outer rectangular frame, the two frames being connected with each other by vertical sides 3, a top 4 and a bottom 5, these several walls being formed of suitable linkage, such as a plurality of intermeshed chains. To prevent undesirable sagging of the top 4 and bottom 5, a plurality of metal bars 6 extend across the same and are suitably connected therewith. The two frames 1 and 2 are preferably, although not necessarily formed of U-iron.

The cage is supported by suitable carriages 7 on a horizontal track 8, any desired connections such as the chains 9, being employed between said cage and carriages. These chains are preferably connected with the uppermost of the bars 6 as shown. The inner end of the track 8 is pivoted at 10 to the warehouse W at a point above its door and the pivot is of such a nature that the track can swing vertically and may also yield horizontally for the purpose to appear. The inner end of the track 8 inclines to the warehouse as indicated by the numeral 10' while its outer end preferably curves upward and is supported by a suitable block and tackle mechanism, including a chain 11. This chain leads to the doorway and may be engaged with a suitable forked plate 12 to hold it when the cage is collapsed against the warehouse as shown for instance in Fig. 2. If desired, the free end of the chain may be locked to a staple 13 in the door frame to secure it in place, so that it can not be released by any unauthorized person.

The numeral 11ª merely designates a chain to limit descent of the track 8.

The outer end of the cage is adapted to bear against the side of a freight car C on the track T and I preferably provide said cage with yieldable pressure members 14 carried by the frame 2 and positioned to engage the side wall of the car and the car door, as indicated in Fig. 3. Each of the members 14 is preferably provided with two horizontally spaced feet 15 and is formed of rubber or the like. Thus, any attempt to push the cage from engagement with the car, by sliding it longitudinally upon the latter, will be prevented.

The members 14 are held in tight contact with the car by means of rods 16 within the cage, suitably connected with the outer frame 2 and secured by any adequate means to the warehouse door frame. I prefer, as illustrated in Fig. 7, to construct the rods 16 from piping for receiving rigid pins 17 which extend inwardly from the sides of the frame 2. By this arrangement, a simple detachable connection is provided between the frame and rods. In securing the rods 16 to the frame of the warehouse, I prefer to employ the construction illustrated most clearly in Figs. 4 and 6. U-shaped guides 18 are swivelled or otherwise connected at 19 to the sides of the warehouse door frame in position to receive the rods 16, each of said guides having a pin or other shoulder 20 for co-action with any of the teeth 21 on said rods, in holding the latter projected, so that the pressure members 14 will be held tightly against the side of the car. To secure the rods in engagement with the shoulders 20, I prefer to pass a padlock 22 through each guide 18. If desired, arms 23 may extend inwardly from the guides 18 to carry circular guides 24 through which the rods 16 may pass.

Normally, that is when the device is not in use, it stands collapsed against the warehouse W with the track 8 either standing in a vertical position or swung outwardly to some extent, being held in position by engagement of the chain 11 with the plate 12. This normally collapsed position of the cage is shown in Fig. 2, but it will be seen that when the chain 11 is manipulated to lower the track 8 to a horizontal position, the carriages 7 which were previously resting upon the inner end portion 10′ of said track, will roll down the latter onto the horizontal body portion of said track. By now engaging the rods 16 with the frame 2 and forcing outwardly upon these rods, the cage is extended so that its pressure members 14 are in frictional engagement with the wall of the freight car and its door. Engagement of the teeth 21 with the shoulders 20 and application of the padlocks 22 or other suitable means, will hold the rods 16 projected to retain the cage in operative position. Either before or after projection of the cage to this position, a suitable sill plate 25 is placed from the warehouse to the car and the workmen loading or unloading may either carry the goods over this sill plate or roll trucks thereover. During this unloading operation, it will be seen that it is impossible for any of the workmen to pass any of the produce outside to confederates or to be picked up later on and furthermore, it is impossible for thieves to enter either the car or the warehouse while the doors thereof stand open. A great protection is thus afforded which will prevent considerable losses heretofore commonly taking place.

While the case is extended for use, if the freight car should be shifted slightly along the track, due for instance to coupling other cars thereto, no injury will result to the cage in view of the fact that its construction permits it to flex laterally and the mounting of the tracks 8 permits this track to laterally swing to the required extent. It will also be seen that the outer frame 2 may be raised or lowered to any desired extent, according to the height of the car door, during which movement the chain mesh sides will flex. While one track is sufficient for supporting certain sizes of cages, it will of course be understood that more tracks may be employed if the cage is of heavier formation.

In the construction shown in Figs. 8 and 9, the numerals 1ª and 2ª designate the inner and outer U-iron frames of the cage, the outer frame being provided with a carriage 7ª movable along a suitable track 8ª which may be rigid with respect to vertical movement, but is pivotally mounted at 9ª in such a manner that it may yield horizontally if necessary. The vertical sides 3ª of the cage shown in Figs. 8 and 9, as well as the top 4ª and the bottom 5ª, are formed of lazy-tong linkage, each link of which is preferably of U-iron, and I prefer to connect said sides, top and bottom, by means of suitable chains 26. Suitable slotted connections 27 are provided between the sides, top and bottom and the end frames 1ª and 2ª. Features of construction shown in connection with this form of the invention, but not specifically described, may be considered as identical with the corresponding features described in connection with the construction shown in Figs. 1 to 7.

To collapse the cage of Figs. 8 and 9 against the side of the warehouse, its holding rods 16 are unlocked and the end frame 2ª is moved inwardly and when complete collapse of the cage has been effected, the track 8ª may be swung substantially flat against the building. It will also be seen that this track may horizontally swing and that the cage may horizontally yield to some extent, if the car is moved while said cage is engaged therewith.

In Figs. 10 and 11, rigid cages 3ᵇ are shown supported upon rollers 28 resting normally upon the warehouse floor as shown in Fig. 10. The frame structure of these cages is preferably formed of angle iron and the sides, top and bottom are constructed of wire or iron rods or strips running either at an incline as shown in Fig. 10 or vertically and horizontally as indicated in Fig. 11. These forms of construction, as well as those described below, may be equipped with the same car-engaging means and the same means for locking the cage projected, as described in the description of Figs. 1 to 7. To support them however, I prefer to provide a carriage 7ᵇ movable along a rigid track 8ᵇ and having a detachable connection with the cage.

Figs. 12 and 13 show constructions which are practically identical with the structures shown in Figs. 10 and 11, except that the cages 3ᶜ illustrated in these figures, are intended to be formed principally of wood, using crossed slats secured to each other.

When a rigid cage such as seen in Figs. 10, 11, 12 and 13 is used, a sill plate may rest on the bottom thereof and slant down at its ends.

All forms of my invention are very desirable and efficient for the purposes intended, regardless of the fact that they are of such construction that they may be easily manufactured and used. As above stated, the construction shown in Figs. 1 to 7 constitutes the preferred form of my invention, but it will be understood that within the scope of the invention as claimed, I need not be restricted to this particular structure, as numerous modifications may be effected.

I claim:

1. A freight protector comprising a cage open at two opposed sides for communication with a car door and the door of a warehouse or other car, said cage being closed on other sides to prevent theft of goods while moving the same from or into the car.

2. A structure as specified in claim 1; together with means releasable by authorized persons only for locking said cage in place.

3. A freight protector for use when moving goods into or from a warehouse, comprising a cage carried by the warehouse and projectable to the car, said cage being open on two sides for communication with the warehouse and car and being closed on other sides to prevent theft of goods while moving the latter to or from the warehouse.

4. A structure as specified in claim 1; said cage being flexible horizontally to prevent injury in case the car should be moved with the cage in place.

5. A structure as specified in claim 1; said cage being collapsible horizontally when not in use.

6. A structure as specified in claim 1; said cage being formed of linkage permitting it to collapse horizontally when not in use.

7. A structure as specified in claim 1; said cage having a chain mesh construction permitting it to collapse horizontally when not in use.

8. A structure as specified in claim 1; said cage consisting of rigid end frames and flexible sides, top and bottom connected thereto.

9. A structure as specified in claim 1; said cage consisting of rigid end frames, sides connecting said frames and laterally flexible top and bottom also connecting said frames.

10. A structure as specified in claim 1; together with yielding pressure pads on said cage adapted to engage the car, and means for holding said cage projected against the car.

11. A structure as specified in claim 1; together with yielding pressure pads on said cage adapted to engage the car, and means for holding said cage projected against the car, each of said pressure pads having horizontally spaced feet for contact with the car.

12. A structure as specified in claim 1; together with a rod connected with said cage, and means for securing said rod to hold the cage in projected position.

13. A structure as specified in claim 1; together with a rod connected with said cage and having teeth, and a relatively stationary guide with which said rod is engaged, said guide having a shoulder co-operable with said teeth to hold said rod and the cage projected for use.

14. A structure as specified in claim 1; together with a rod connected with said cage and having teeth, a relatively stationary guide with which said rod is engaged, said guide having a shoulder co-operable with said teeth to hold said rod and the cage projected for use, and means for locking said rod in engagement with said shoulder.

15. A structure as specified in claim 1; together with an inwardly extending pin on the cage, a rod having a socket in one end receiving said pin, and means for holding said rod to hold the cage projected.

16. A freight protector comprising an open-ended horizontally collapsible cage adapted to be secured at one end to a warehouse, a track adapted to be pivoted to the warehouse, carriages supporting said cage from said track, and means for swinging said track upwardly around its pivot.

17. A structure as specified in claim 16, said cage and arm being horizontally yieldable for the purpose set forth.

18. A structure as specified in claim 16, said track having a normally inclined inner end for the purpose set forth.

In testimony whereof I have hereunto affixed my signature.

RICHARD A. AINSA.